(12) United States Patent
Heupel

(10) Patent No.: US 11,215,806 B2
(45) Date of Patent: Jan. 4, 2022

(54) METHOD FOR IMAGING A SAMPLE BY MEANS OF A MICROSCOPE AND MICROSCOPE

(71) Applicant: Carl Zeiss Microscopy GmbH, Jena (DE)

(72) Inventor: Thorsten Heupel, Munich (DE)

(73) Assignee: Carl Zeiss Microscopy GmbH, Jena (DE)

( * ) Notice: Subject to any disclaimer, the term of this patent is extended or adjusted under 35 U.S.C. 154(b) by 758 days.

(21) Appl. No.: 14/830,613

(22) Filed: Aug. 19, 2015

(65) Prior Publication Data

US 2016/0054551 A1    Feb. 25, 2016

(30) Foreign Application Priority Data

Aug. 21, 2014    (DE) .................... 10 2014 112 002.7

(51) Int. Cl.
*G02B 21/00*    (2006.01)
*G02B 21/16*    (2006.01)
(Continued)

(52) U.S. Cl.
CPC ....... *G02B 21/008* (2013.01); *G02B 21/0032* (2013.01); *G02B 21/0044* (2013.01); *G02B 21/0084* (2013.01); *G02B 21/06* (2013.01); *G02B 21/16* (2013.01); *G02B 21/365* (2013.01); *G06K 9/6201* (2013.01); *G06T 5/50* (2013.01); *H04N 5/235* (2013.01);
(Continued)

(58) Field of Classification Search
None
See application file for complete search history.

(56) References Cited

U.S. PATENT DOCUMENTS 6,195,469 B1    2/2001    Nishioka et al.
6,704,457 B1    3/2004    Sugiura
(Continued)

FOREIGN PATENT DOCUMENTS

EP    0986245 A2    3/2000
EP    1511293 A2    3/2005
(Continued)

*Primary Examiner* — David N Werner
(74) *Attorney, Agent, or Firm* — Christensen, Fonder, Dardi & Herbert PLLC

(57) ABSTRACT

A method for imaging a sample using a microscope having an illumination unit, an imaging lens system and an image sensor, includes: illuminating an area of the sample; imaging and magnifying the sample onto the image sensor and capturing the image using a predetermined number of pixels; providing a plurality of different comparison sample areas; for each comparison sample area, performing a reference measurement, wherein the comparison sample areas are illuminated, imaged and magnified onto the image sensor and captured with the predetermined number of image pixels as a reference image; determining a brightness-correction image with the predetermined number of image pixels by determining the value for each image pixel of the brightness-correction image from the values of allocated image pixels of the reference images, and correcting the image of the area of the sample captured based on the brightness-correction image and outputting it as a corrected image.

16 Claims, 3 Drawing Sheets

(51) Int. Cl.
*G02B 21/36* (2006.01)
*H04N 5/235* (2006.01)
*G06T 5/50* (2006.01)
*G02B 21/06* (2006.01)
*G06K 9/62* (2006.01)
*H04N 5/232* (2006.01)
*H04N 5/243* (2006.01)

(52) U.S. Cl.
CPC ......... *H04N 5/2351* (2013.01); *H04N 5/2352* (2013.01); *H04N 5/2354* (2013.01); *H04N 5/2356* (2013.01); *H04N 5/23296* (2013.01); *H04N 5/243* (2013.01)

(56) References Cited

U.S. PATENT DOCUMENTS

| | | |
|---|---|---|
| 2001/0028391 A1 | 10/2001 | Iko |
| 2004/0234114 A1 | 11/2004 | Amakawa et al. |
| 2005/0046905 A1 | 3/2005 | Aizaki et al. |
| 2005/0243414 A1* | 11/2005 | Masuyama ............ G02B 21/06 359/387 |
| 2006/0186311 A1 | 8/2006 | Backs et al. |
| 2009/0180175 A1 | 7/2009 | Tümpner |
| 2010/0150472 A1* | 6/2010 | Chen ........................ G06T 5/50 382/278 |
| 2011/0109736 A1* | 5/2011 | Mertz .................... G06T 5/008 348/79 |
| 2013/0329033 A1 | 12/2013 | Shibata et al. |
| 2014/0198197 A1 | 7/2014 | Kaminaga |
| 2015/0092035 A1* | 4/2015 | Yamamoto ......... A61B 1/00188 348/68 |
| 2015/0116476 A1* | 4/2015 | Kang .................. H04N 5/2354 348/79 |
| 2015/0116477 A1* | 4/2015 | Kang .................. G02B 21/365 348/79 |
| 2015/0136949 A1* | 5/2015 | De Nooij ............ G02B 21/367 250/208.1 |

FOREIGN PATENT DOCUMENTS

| | | |
|---|---|---|
| JP | H08-340558 A | 12/1996 |
| JP | 2006-275964 A | 10/2006 |
| JP | 2008-51773 A | 3/2008 |
| JP | 2009-053116 A | 3/2009 |
| WO | WO 2004/038483 | 5/2004 |

* cited by examiner

METHOD FOR IMAGING A SAMPLE BY MEANS OF A MICROSCOPE AND MICROSCOPE

PRIORITY CLAIM

The present application claims priority to German Patent Application No. 102014112002.7 filed on Aug. 21, 2014, which said application is incorporated by reference in its entirety herein.

FIELD OF THE INVENTION

The present invention relates to a method for imaging a sample by means of a microscope as well as a microscope.

BACKGROUND

In a method for imaging a sample by means of a microscope which has at least an illumination unit, an imaging lens system and an image sensor, for the imaging, an area of the sample can be illuminated with illumination radiation by means of the illumination unit, and the illuminated sample area can be imaged, magnified, onto the image sensor by means of the imaging lens system and an image of the illuminated sample area can be captured with a predetermined number of image pixels.

There is often the difficulty that the illumination of the sample by means of the illumination unit is not optimum. Thus a systematic error can remain which is reflected, e.g., in a non-uniform brightness distribution of the illumination over the sample. Even the imaging lens system is often not optimum. It can bring about an undesired inhomogeneity in the captured image.

SUMMARY OF THE INVENTION

Starting from this, the object of the invention is to provide a method for imaging a sample by means of a microscope in which this difficulty is removed as completely as possible. Furthermore, a corresponding microscope is to be provided.

According to an embodiment of the invention, the object is achieved by a method for imaging a sample by means of a microscope which has an illumination unit, an imaging lens system and an image sensor, wherein for the imaging the following steps are carried out:

a) an area of the sample is illuminated with illumination radiation by means of the illumination unit, b) the illuminated sample area is imaged, magnified onto the image sensor by means of the imaging lens system and an image of the illuminated sample area is captured with a predetermined number of image pixels, c) a plurality of different areas of one or more comparison samples are provided, d) on each comparison sample area provided in step c) a reference measurement is performed, wherein in each case the comparison sample area is illuminated with illumination radiation by means of the illumination unit and imaged, magnified, onto the image sensor by means of the imaging lens system and captured with the predetermined number of image pixels as a reference image, e) a brightness correction image with the predetermined number of image pixels is determined by determining the value for each image pixel of the brightness correction image from the values of allocated image pixels of the reference images, and f) the image of the area of the sample captured by means of steps a) and b) is corrected on the basis of the brightness correction image and output as a corrected image.

Through the capture of the plurality of different areas, e.g. a systematically induced non-uniformity of the illumination can be determined in step e) and a corresponding brightness correction image can be provided. A correction of the non-uniformity of the illumination can thus be achieved in a simple manner.

With the method according to the invention, all inhomogeneities which are caused by the illumination-side beam path and/or imaging-side beam path can thus be eliminated or reduced. This can in particular involve filters (if present), objective lenses, a condenser (if present), tube lens, image sensor, etc. As a rule, the undesired disruptive influence is greater on the illumination side than on the imaging side.

With the method according to the invention, systematically induced inhomogeneities and/or undesired brightness variations in the captured image can thus be reduced.

In particular, an averaging of the values of the allocated image pixels of the reference images can be performed in step e) for the determination of the image pixel values of the brightness correction image. Such an averaging can be calculated easily and quickly and leads to good results.

The averaging can be an arithmetic averaging. Furthermore, it is possible to perform a weighted averaging.

In step e) the values of the allocated image pixels can be filtered and only the values of the allocated image pixels which meet a predetermined filter criterion of the filtering can be taken into account in the determination of the image pixel values of the brightness correction image. Thus, e.g., so-called outliers which clearly lie outside the brightness range to be expected can be filtered out.

Furthermore, it is possible, before step e), to separate out reference images which are over- or underexposed and not to take them into account in step e). The determination of whether an image is over- or underexposed can be performed in the usual manner. Thus, according to the invention, over- or underexposed images can be separated out and not taken into account in the determination of the image pixel values of the brightness correction image, with the result that the brightness correction image better reflects the systematic error of the illumination.

In step c) a comparison sample can itself be the sample to be imaged.

In particular, in the method according to the invention, the image sensor can have a linear detection range and only image pixels of the reference images the value of which lies in the linear detection range of the image sensor can be taken into account in step e). By the linear detection range of the image sensor would be meant in particular the range which leads to a linear increase in the measured value in the case of a linear increase in the brightness. The precision of the determination of the brightness correction image can be improved by this.

Furthermore, the images captured in step b) can be used continuously as reference images in step e). A continuous improvement in the determined brightness correction image is thus achieved. In this way, changes in the non-uniformity of the illumination over time can also be compensated for.

The samples can in particular be fluorescent samples.

In step e) precisely one image pixel of the respective reference image can be allocated to each image pixel of the brightness correction image.

In an embodiment of a method according to the invention, furthermore, several image pixels of the respective reference image can be allocated to each image pixel of the brightness correction image in step e). Thus, e.g., a first image pixel of the respective reference image as well as at least one second pixel of the respective reference image which borders the first pixel can be allocated to each image pixel of the brightness correction image.

In the determination of the image pixel values of the brightness correction image, furthermore, the at least one second pixel can be weighted lower than the first pixel. In particular the weighting can be chosen such that it decreases as the distance from the first pixel increases. It is also possible for all pixels to be weighted the same.

In an embodiment of a method according to the invention at least 100 different areas can be provided in step c). In particular, at least 200, 300 or 400 different areas can also be provided. Approx. 300 different areas are particularly advantageous, as has been shown in theoretical and practical tests.

In an embodiment of a the method according to the invention the sample to be imaged can be used as a comparison sample in step c), wherein the captures of the sample can then be used to determine the brightness correction image and the thus-determined brightness correction image is used in the correction of the captures of the sample according to step f). Thus the captures of the sample can, on the one hand, be used to determine the brightness correction image and, on the other hand, be corrected and processed further with the then-determined brightness correction image immediately as desired captures according to step a) and b).

Thus a sample-specific correction can be implemented, in which inhomogeneities which are caused by the sample (e.g., bleaching behavior) can be corrected well.

Furthermore a microscope with an illumination unit, an imaging lens system, an image sensor and a control unit which is formed such that it performs the steps of the method according to the invention (including the developments thereof) is provided.

The microscope can in particular be formed as a so-called slide scanner. Such a slide scanner can have a tray in which several specimen slides with samples fixed on them can be arranged. The specimen slides held in the tray can then be automatically imaged, magnified, in succession. In particular, a transmitted-light capture and/or a reflected-light capture is possible. The microscope can be formed as a fluorescence microscope. In particular, it can have several fluorescence channels.

The microscope can in particular have an excitation filter in the illumination beam path and/or an emission filter in the imaging beam path. Furthermore or in addition, a color splitter is provided which is preferably arranged in the illumination and imaging beam paths. These filters are in particular provided if the microscope is formed as a fluorescence microscope.

The generation and taking into account of the brightness correction image according to the invention can take place ex works, before commissioning and/or during operation of the microscope. In particular, it can take place during operation.

It is also possible to correct the images captured by means of the microscope afterwards by means of the brightness correction image. However, the correction preferably already takes place during the capture and output of the images. Naturally, the microscope can also be formed such that the captured images are preserved as raw data and the images corrected by means of the brightness correction image are generated and likewise output.

It is understood that the features mentioned above and those yet to be explained in the following are applicable, not only in the stated combinations, but also in other combinations or singly, without departing from the scope of the present invention.

BRIEF DESCRIPTION OF THE DRAWINGS

The invention is explained in even more detail below by way of example with reference to the attached drawings, which also disclose features essential to the invention. There are shown in.

DETAILED DESCRIPTION

Figure 1:
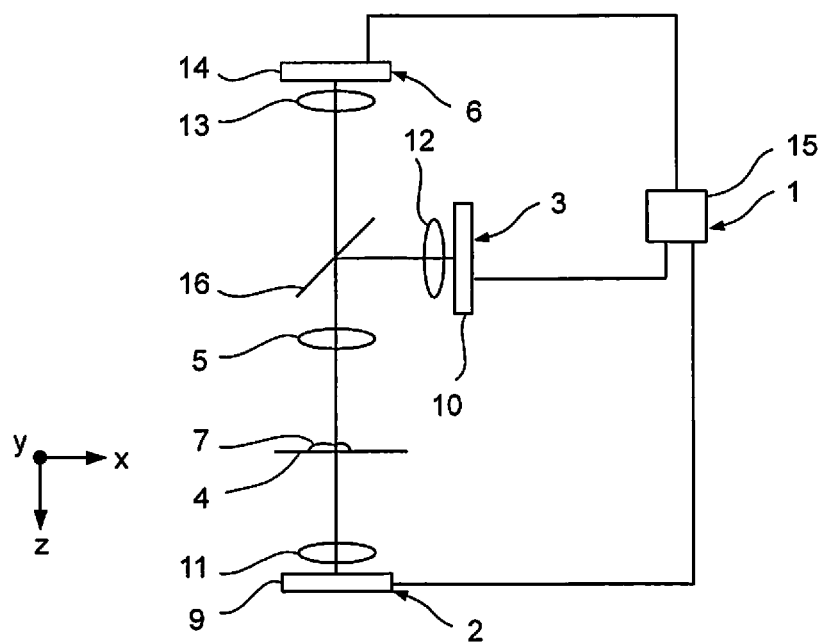
FIG. 1 a schematic representation of an embodiment of the microscope according to an embodiment of the invention.

In the embodiment shown in FIG. 1, the microscope 1 according to an embodiment of the invention comprises a transmitted-light illumination unit 2, a reflected-light illumination unit 3, a sample stage 4, an imaging lens system 5, as well as a capture unit 6.

The microscope 1 can be operated as a transmitted-light microscope in which a sample 7 arranged on the sample stage 4 or an area of the sample 7 is illuminated from below by means of the transmitted-light illumination unit 2 and can be captured, magnified, from above by the capture unit 6 by means of the imaging lens system 5. By means of the capture unit 6 the desired image of the illuminated sample area can then be captured, wherein the captured image has a predetermined number of image pixels.

The microscope 1 can furthermore be operated as a reflected-light microscope in which the sample 7 arranged on the sample stage 4 or an area of the sample 7 can be illuminated from above by means of the reflected-light illumination unit 3 and can be captured, magnified, from above by the capture unit 6 by means of the imaging lens system 5.

The two illumination units 2, 3 each have a light source 9, 10 (e.g., an LED light source, a laser light source or a mercury lamp) as well as an illumination lens system 11, 12. The capture unit 6 comprises a capture lens system 13 and an image sensor 14. The image sensor 14 can for example be a CCD sensor or a CMOS sensor.

The transmitted-light illumination unit 2 can, e.g., emit light in a wavelength range of 400-700 nm. The reflected-light illumination unit 3 can, for example, be used for fluorescence captures. It can for example emit radiation with a wavelength of 365 nm, 385 nm, 420 nm, 445 nm, 455 nm, 470 nm, 505 nm, 530 nm, 590 nm, 615 nm or 625 nm (preferably selectably). Radiation with a wavelength range of 540-580 nm is also possible. Naturally, other wavelengths are also possible depending on the type of the light source for fluorescence excitation.

The light sources 9, 10 and the image sensor 14 are connected to a control unit 15 of the microscope 1 which on the one hand controls the light sources 9, 10 during operation and on the other hand receives the image data of the image sensor 14. Furthermore, a beam splitter 16, which is used for the reflected-light illumination in order to couple the light of the light source 10 into the imaging beam path of the microscope 1 via the beam splitter 16, is provided, as well as an excitation filter 17 and an emission filter 18.

The beam splitter 16 as well as the two filters 17 and 18 are motorized and can thus be swivelled into the beam path and swivelled out of the beam path. The elements 16-18 are swivelled into the beam path for fluorescence captures, wherein their optical properties in respect of transmission and reflection are chosen such that they can excite specific dyes in cooperation with the radiation of the light source 10 and filter out specific fluorescence emissions.

The representation in FIG. 1 is very schematic. The microscope according to the invention can have further elements which are necessary for its operation. The microscope 1 according to the invention can also be formed such that only the transmitted-light illumination unit 2 or the reflected-light illumination unit 3 is provided. In addition, it is possible for the sample stage 4 to be movable at least in the x- and y-directions. This movement is preferably motor-powered and can be controlled via the control unit 15. A movement in the z-direction is also possible. The movement in the z-direction can be brought about by movement of the sample stage 4 and/or the imaging lens system 5 in the z-direction. Furthermore, the imaging lens system 5 can be replaceable, with the result that different optical magnifications can be set for the imaging of the sample 7.

The microscope 1 can in particular be formed as a so-called slide scanner in which several specimen slides arranged in a tray, not shown, of the microscope 1 with samples provided on them (for example fixed-tissue sections) are automatically brought into the position of the sample stage 4 (which can, for example, be dispensed with in this case) in succession and then the desired captures are performed. It is furthermore possible for the slide scanner to be formed such that the respective sample is moved together with the specimen slide by means of a transfer unit from the tray to the sample stage 4 and deposited there. The transfer unit can then transport the specimen slide with the sample back to the tray after the desired capture has been performed.

Because the illumination or lighting of the captured area by means of the illumination unit 2, 3 is not ideal as a rule, the captured image has image errors which are caused by an illumination that is not ideal. In addition, the imaging lens system 5 as well as the elements 16-18, which can, e.g., be provided for fluorescence captures, can also have a negative influence which can lead to image errors. Quite generally, all optical elements contained in the optical beam path (illumination beam path and imaging beam path) can bring about image errors.

According to embodiments of the invention, the captured image is therefore, as described in detail below, corrected on the basis of a brightness correction image and output as a corrected image. The brightness correction image contains details of the unevenness of the illumination which are preferably independent of the sample just captured. The correction performed on the basis of the brightness correction image can also be called a "shading" correction.

The brightness correction image preferably has the same predetermined number of image pixels as the captured image. Furthermore a brightness correction image is preferably generated for the capture settings with which the sample area of the sample 7 was or is to be captured. In particular, these can be settings of the illumination unit 2, 3, such as, e.g., the wavelength of the illumination light used.

To determine the brightness correction image a plurality of different areas of one or more comparison samples are captured with the predetermined number of image pixels as reference images by means of the microscope 1 according to the invention. These reference images are averaged pixel by pixel, with the result that there is an average-value image in which the individual structures of the captured sample areas are eliminated as completely as possible by the averaging. The average-value image preferably thus contains only the constant and therefore sample-independent errors of the microscope according to the invention. The average-value image can thus be used as a brightness correction image. For example, the corresponding brightness value of the brightness correction image can be subtracted pixel by pixel from the captured image.

The principle of averaging the brightness correction image is to be explained theoretically below using a row of pixels in a predetermined direction (e.g., the x-direction) of 21 pixels from the predetermined number of pixels which are provided by the image sensor 6.

Figure 2:
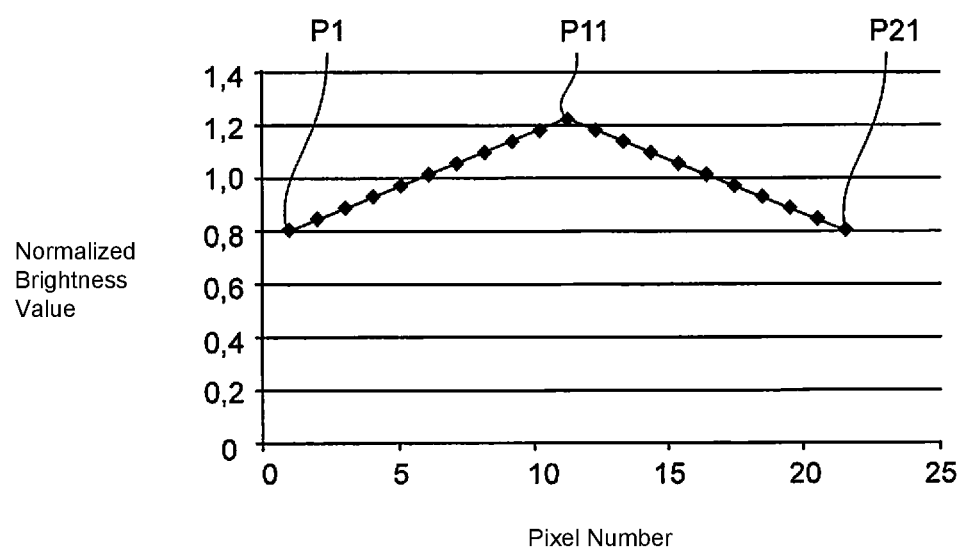
FIG. 2 a diagram to explain the non-uniformity of the illumination by means of the illumination unit 2, 3 of the microscope 1 from FIG. 1.

In FIG. 2, the pixels are represented along the x-axis and the brightness values of the illumination in the sample plane are represented along the y-axis. The brightness values here are normalized such that the average value is 1. It is assumed that the curve shown in FIG. 2 is present, with the result that, e.g., the eleventh pixel P11 has a value just over 1.2 and the first and last pixels P1 and P21 have a value of approximately 0.8. This is a simulation of a schematic inhomogeneity of the illumination and in the further description of the microscope according to embodiments of the invention and of embodiments of a method according to the invention, reference is made thereto below representing the systematic image errors of the capture generated by the illumination and imaging beam paths of the microscope 1.

Figure 3:
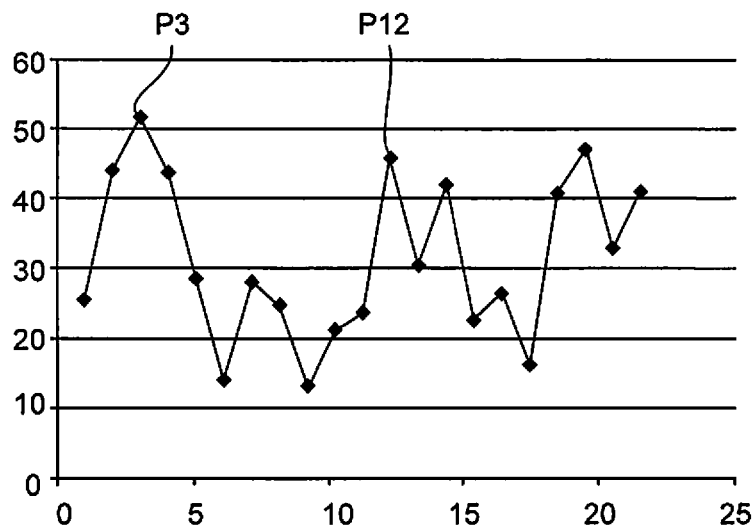
FIG. 3 a schematic representation of brightness values of a sample under ideal illumination.

In FIG. 3, brightness values of a sample are represented for the 21 pixels under consideration, which would result if the illumination were ideal and thus even. In FIG. 3, again, the pixels are plotted along the x-axis and the brightness values are plotted along the y-axis in arbitrary units. These values were created with random numbers in order thus to simulate a sample.

Figure 4:
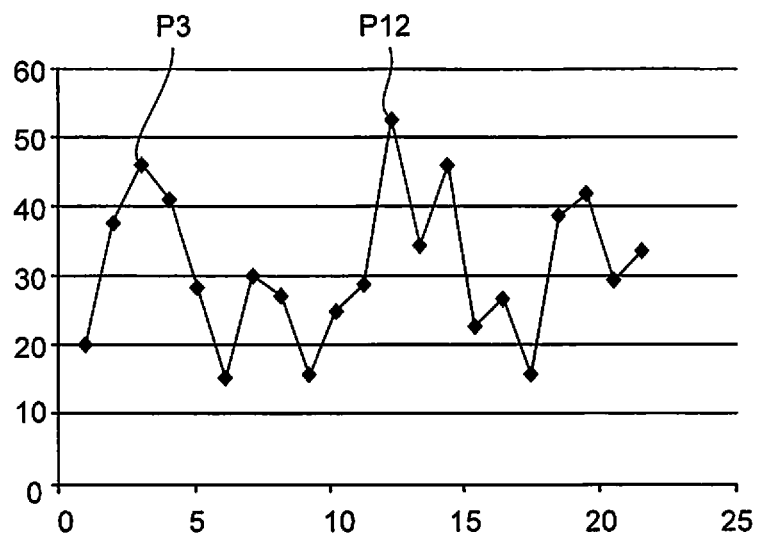
FIG. 4 a representation according to FIG. 3 taking into account the illumination according to FIG. 2.

Because of the unevenness of the illumination according to FIG. 2, however, the brightness values shown in FIG. 4 then result, in the capture and thus in the reference image. These values result from a computation of the values from FIGS. 2 and 3 by means of a multiplication operation. As revealed by the representation according to FIG. 4 in comparison with FIG. 3, e.g., the brightness value for the third pixel P3 is too low and the brightness value for the twelfth pixel P12 is too high.

Figure 5:
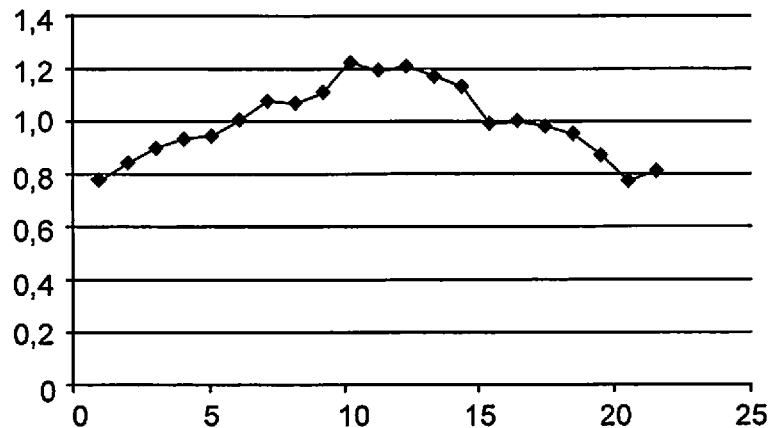
FIG. 5 a diagram to explain the determined brightness correction image.

If a plurality of different samples 7 or sample areas are now captured and in each case the values of a pixel are averaged over all captures (or reference images) and these averaged values are normalized to 1, e.g., the brightness correction image shown in FIG. 5 is obtained (the representation in FIG. 5 corresponds to the representation according to FIG. 2).

For the brightness correction image according to FIG. 5, 300 randomly generated samples (pixel curves according to FIG. 3) were offset with the illumination distribution according to FIG. 2 and then averaged pixel by pixel. The image field curvature of the brightness correction image has a residual error which lies in the range of at most ±5%. The illumination unevenness was thus able to be determined with an error of only ±5% from the captured reference images. If the number of the randomly generated samples is increased, the value improves further.

Tests with real samples gave the same results.

With the averaging carried out for each pixel, the structural portions of the captured areas of the comparison samples can be filtered out of the captures (or reference images), with the result that the thus-generated brightness correction image reflects the systematic and thus sample-independent errors of the microscope 1.

If several channels are used, a separate brightness correction image is preferably generated for each channel. This applies in particular to fluorescence applications.

The averaging can, e.g., be an arithmetic averaging. However, a weighted averaging is also possible. In addition, it is possible to use a filter in the averaging, which recognizes and filters out, e.g., outliers, thus image pixels of the reference images which are clearly too light or too dark, with the result that they are not taken into account in the averaging. Furthermore, as a whole, over- or underexposed images can be excluded from the averaging. A Gaussian filter, a sigma filter and/or a low-pass filter can, e.g., be used as a filter.

In addition, e.g., only the values of the reference images which lie in the linear range of the image sensor may be taken into account in the averaging.

Figure 6:
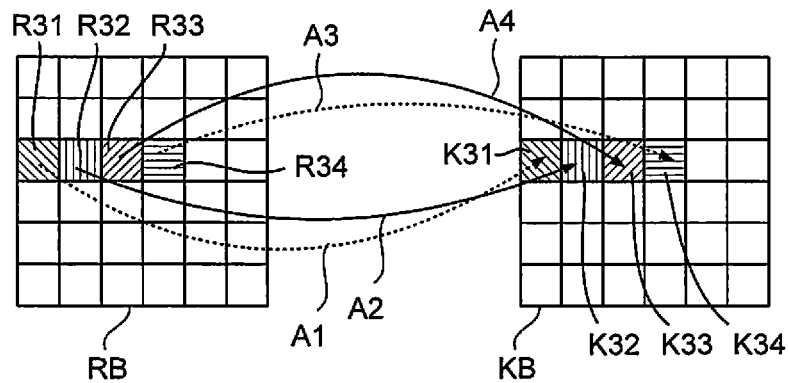
FIG. 6 a representation to explain the 1:1 allocation between an image pixel of the brightness correction image and the image pixels of the reference images.

Up to now, it has been assumed that only the corresponding image pixels of the reference images RB are taken into account for the brightness correction value of a pixel of the brightness correction image KB, as represented schematically in FIG. 6 by shading and arrows A1, A2, A3 and A4 for the pixels R31, R32, R33 and R34 of a representatively shown reference image RB and the pixels K31, K32, K33 and K34 of the brightness correction image KB. This corresponds to a 1:1 allocation of the respective image pixel of the brightness correction image KB to the corresponding image pixels of the reference images RB. However, a 1:n allocation is possible. In this case, e.g., adjoining pixels of the reference images RB can also be taken into account in the determination of the average for the corresponding image pixel of the brightness correction image.

Figure 7:
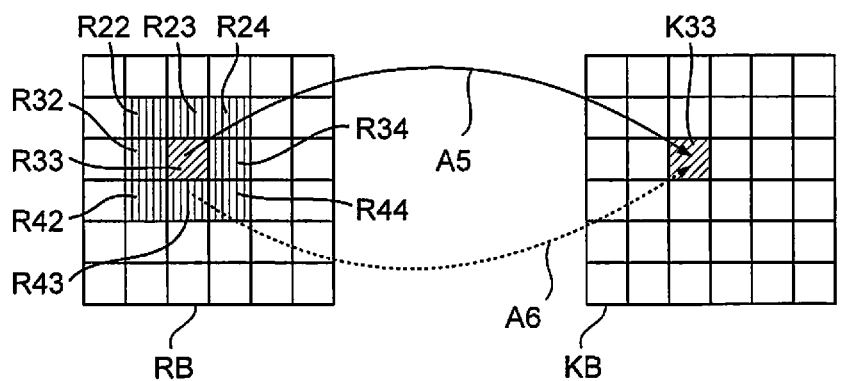
FIG. 7 a schematic representation to explain a 1:n allocation of a pixel of the brightness correction image to the pixels of the reference images, and FIG. 8 a further representation to explain the 1:n allocation of a pixel of the brightness correction image to the pixels of the reference images.
Figure 8:
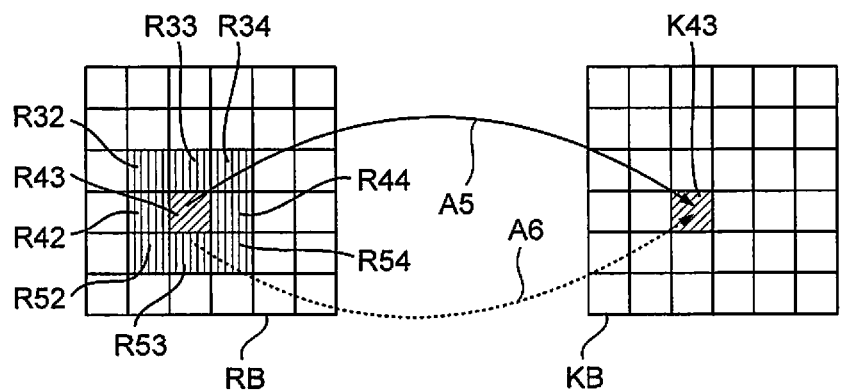

Such a 1:n allocation is shown schematically in FIGS. 7 and 8. In the representation according to FIG. 7, in addition to the pixel R33 of the reference images RB, the pixels R22, R23, R24, R32, R34, R42, R43 and R44 surrounding this pixel are also allocated to the pixel K33 of the brightness correction image KB.

As indicated in FIG. 8, in addition to the pixel R43 of the reference images RB, the pixels R32, R33, R34, R42, R44, R52, R53 and R54, surrounding this pixel, of the reference images RB are also allocated to the pixel K43 of the brightness correction image KB.

Naturally, even more pixels of the reference images RB can also be allocated to a pixel of the brightness correction image KB. These are then not only the immediate neighbors of a corresponding pixel of the reference images RB but also further removed neighbors.

These further image pixels can be taken into account in a weighted manner, with the result that at a greater distance there is a smaller weighting. This is indicated in FIGS. 7 and 8 by the shading and arrows A5 and A6. Thus, e.g., the respective 1:1 pixel (in FIG. 7 this is R33 and in FIG. 8 it is R43, arrow A5) can be taken into account with a higher weighting than the surrounding pixels (R22, R23, R24, R32, R34, R42, R43 and R44 as well as R32, R33, R34, R42, R44, R52, R53 and R54, arrow A6).

The described method according to the invention can be used as an offline method and/or as an online method.

In the offline method, the captures are performed in the described manner and the brightness correction image is generated therefrom. These captures are performed without correction by means of a brightness correction image and thus without shading correction. The thus-generated brightness correction image is then placed in the microscope according to the invention and can be used for brightness correction in further captures.

In the online method, using the individual captures or individual images of the sample which are captured for their digitization, a brightness correction image can be generated immediately, which is then used for the brightness correction of the desired captures (or individual images) of the sample.

With this procedure of the online method, it can advantageously be achieved that not only are device-specific inhomogeneities eliminated, but even preparation-specific inhomogeneities (e.g., bleaching behavior).

The method according to the invention can in particular be formed such that the user can set whether he desires to use the offline method or the online method before performing the captures of the sample and thus before the digitization of the sample. In particular, the microscope 1 according to an embodiment of the invention can be formed such that the choice of the method (offline method or online method) is possible.

The sample to be captured can be captured in one image or in several partial images. The principle of the described brightness correction, however, remains the same.

What is claimed is:

1. A method for imaging a sample by using a microscope which has at least an illumination unit, an imaging lens system and an image sensor, the method comprising the following steps:
    a) illuminating a first area of the sample with illumination radiation of the illumination unit, wherein the first area of the sample comprises an area that is less than an entire area of the sample, and all portions of the first area of the sample are illuminated;
    b) imaging and magnifying the illuminated first area of the area onto the image sensor using the imaging lens system and capturing an image of the illuminated first area of the sample with a predetermined number of image pixels;
    c) providing a plurality of images of comparison sample areas of one or more comparison samples, each of the images of the comparison sample areas captures a region of the sample that is different than a region of the sample associated with the first area of the sample;
    d) performing a reference measurement on each comparison sample area provided in step c), wherein in each case all portions of each of the comparison sample areas are illuminated with illumination radiation of the illumination unit and imaged, magnified, onto the image sensor by the imaging lens system and captured with the predetermined number of image pixels as a reference image;
    e) determining a brightness correction image with the predetermined number of image pixels by determining a value for each image pixel of the brightness correction image from values of allocated image pixels of the reference images; and f) correcting an image of the first area of the sample captured in steps a) and b) on the basis of the brightness correction image and outputting the image as a corrected image.

2. The method according to claim 1, in which an averaging of the values of the allocated image pixels of the reference images is performed in step e) for the determination of the image pixel values of the brightness correction image.

3. The method according to claim 1, in which in step e) the values of the allocated image pixels are filtered and only the values of the allocated image pixels which meet a predetermined filter criterion of the filtering are taken into account in the determination of the image pixel values of the brightness correction image.

4. The method according to claim 1, in which reference images which are over- or underexposed are separated out before step e) and not taken into account in step e).

5. The method according to claim 1, in which in step c) a comparison sample is the sample to be imaged.

6. The method according to claim 1, in which the image sensor has a linear detection range and only image pixels of the reference images the value of which lies in the linear detection range of the image sensor are taken into account in step e).

7. The method according to claim 1, in which the images captured in step b) are used continuously as reference images in step e).

8. The method according to claim 1, in which the samples are fluorescent samples.

9. The method according to claim 1, in which several image pixels of the respective reference image are allocated to each image pixel of the brightness correction image in step e).

10. The method according to claim 1, in which a first image pixel of the respective reference image as well as at least one second pixel of the respective reference image which borders the first pixel is allocated to each image pixel of the brightness correction image.

11. The method according to claim 10, in which in the determination of the image pixel values of the brightness correction image of the at least one second pixel is weighted lower than the first pixel.

12. The method according to claim 1, in which in step e) precisely one image pixel of the respective reference image is allocated to each image pixel of the brightness correction image.

13. The method according to claim 1, in which at least 100 different areas are provided in step c).

14. The method according to claim 1, in which in step c) the sample to be imaged is provided as a comparison sample, the brightness correction image determined according to steps d) and e) is based on captures of this comparison sample and in step f) this brightness correction image is used to generate the corrected image of the sample.

15. A microscope comprising:
an illumination unit including a light source for illuminating the sample;
an image sensor; and
a control unit connected to the illumination unit and the imaging lens system, which is configured such that it performs the steps of:
a) illuminating a first area of the sample with illumination radiation of the illumination unit,
wherein the first area of the sample comprises an area that is less than an entire area of the sample,
and all portions of the first area of the sample are illuminated;
b) imaging and magnifying the illuminated first area of the area onto the image sensor using the imaging system
and capturing an image of the illuminated first area of the sample with a predetermined number of image pixels;
c) providing a plurality of images of comparison sample areas of one or more comparison samples, each of the images of the comparison sample areas captures a region of the sample that is different than a region of the sample associated with the first area of the sample;
d) performing a reference measurement on each comparison sample area provided in step c),
wherein in each case all portions of each of the comparison sample areas are illuminated with illumination radiation of the illumination unit
and imaged, magnified, onto the image sensor by the imaging lens system
and captured with the predetermined number of image pixels as a reference image;
e) determining a brightness correction image with the predetermined number of image pixels by determining a value for each image pixel of the brightness correction image from values of allocated image pixels of the reference images; and
f) correcting an image of the first area of the sample captured in steps a) and b) on the basis of the brightness correction image
and outputting the image as a corrected image.

16. The microscope according to claim 15, in which the microscope has an illumination beam path and an imaging beam path, wherein a color splitter, an excitation filter in the illumination beam path and/or an emission filter in the imaging beam path is/are arranged in order to enable fluorescence captures.

* * * * *